United States Patent [19]

Valdiserri

[11] 3,974,132

[45] Aug. 10, 1976

[54] PROCESS FOR CURING OLEFIN POLYMERS
[75] Inventor: Leo L. Valdiserri, Washington, W. Va.
[73] Assignee: Borg-Warner Corporation, Chicago, Ill.
[22] Filed: May 15, 1975
[21] Appl. No.: 577,585

[52] U.S. Cl. ............................. 526/20; 260/878 R; 526/21; 526/27; 526/57; 526/339; 526/349; 526/352
[51] Int. Cl.² ...................... C08F 8/40; C08K 5/49
[58] Field of Search ............... 260/878 R, 94.9 GA, 260/88.2 S, 80.78

[56] References Cited
UNITED STATES PATENTS
3,351,604  11/1967  Safford et al. .................. 260/878 R
3,640,919  2/1972  Michels et al. ............... 260/94.9 GA FOREIGN PATENTS OR APPLICATIONS
1,047,053  11/1966  United Kingdom
1,183,994  3/1970  United Kingdom ............. 260/878 R

OTHER PUBLICATIONS

Plastec Report R41, "Applications of Ionizing Radiation in Plastics and Polymer Technology", Picatinny Arsenal.
"Allyl-Verbindungen als Coagentien der peroxidischen Vernetzung", *Kautschuk und Gumm-Kunststoffe*, 24, pp. 334–337.
"Evaluation of Cross-Linking Coagents in Ethylene-Propylene Rubber", *I & EC Prod. Res. and Devel.*, vol. 2, No. 3, Sept. 1963, pp. 202–208.
"EPM + EPDM for Wire & Cable", *Rubber World*, Jan., 1966, pp. 79–88.

*Primary Examiner*—Alan Holler
*Attorney, Agent, or Firm*—Joseph Shekleton

[57] ABSTRACT

Heat-curable ethylene polymer compositions wherein triallyl phosphate is used as a coagent. The composition also contains an organic peroxide catalyst.

13 Claims, No Drawings

PROCESS FOR CURING OLEFIN POLYMERS

This invention relates to certain cross-linked polymers of ethylene. In a more particular sense, it relates to the cross-linking of ethylene polymers with triallyl phosphate. Still more particularly, it relates to the use of triallyl phosphate as a so-called co-agent in the cross-linking of certain ethylene polymers.

The insulation and coating of electrically conductive wire and cable is a highly developed art and the amount of synthetic polymeric material used for such purposes is such as to attract considerable investigative research. Depending upon the type of wire or cable to be coated, the use to which it will be put, and the environment in which it will be used, various degrees of thermal stability, ultimate tensile strength, hardness, range of melting temperature, modulus, elongation, etc. are required. All of these are affected significantly by the degree of cross-linking of the polymer, as well as by the type of cross-linking agent used to effect the cross-linking reaction. A cross-linked polymer will have a higher heat distortion temperature and heat resistance, for example, than the same polymer which is not cross-linked, and in general the heat distortion temperature will vary directly with the degree of cross-linking. On the other hand, elongation, i.e., the extent to which a material will stretch without breaking, generally varies inversely with the degree of cross-linking. Cross-linking is an important aspect of the preparation of polymeric compositions.

Ethylene polymers are characterized by excellent moisture resistance, high mechanical strength and low dielectric loss. They are also non-polar and chemically inert. Furthermore, these electrical properties are substantially unaffected over a wide range of temperatures and frequencies. Polyethylene is lightweight but tough, is easily adaptable to molding, extension and calendering operations, and has an excellent price-value relationship. These properties are required for materials which are to be used in insulation and jacketing in the wire and cable art.

The cross-linking of ethylene polymers ordinarily is accomplished by means of an organic peroxide. Depending to some extent upon the availability of double bonds in the ethylene polymer molecule, as for example in EPDM, sulfur may also be used along with the organic peroxide to effect cross-linking or vulcanization. This cross-linking reaction is as indicated effective to improve significantly the properties of the ethylene polymer, but still more improvement is desirable. An improved polymeric material would have better odor, higher modulus, lower elongation, increased electrical stability, and better retention of physical qualities at elevated temperatures. Furthermore, the cure system itself is not entirely satisfactory. The organic peroxide-sulfur cure system, for example, tends to be "scorchy", i.e., it causes the polymer to "set up" or become cross-linked prematurely while it is being processed in an extruder; this in turn requires a low barrel temperature and cooling-water control of the head temperature. An interesting discussion of the use of ethylene-propylene rubbers in the wire and cable art is contained in the January, 1966 issue of Rubber World at pages 79–89. Another interesting article in this area is found at pages 334–7, Volume 24 of Kautschuk and Gumm — Kuntststoffe.

For many applications it is beneficial to use a co-agent in the cross-linking step. The co-agent regulates the generation of free radicals and thus modifies the type of cross-link and improves the efficiency of the cross-linking reaction. Furthermore, use of the co-agent permits the use of less peroxide.

Although sulfur is the more commonly used "co-agent" in the cross-linking of ethylene-propylene rubbers, other cross-linking co-agents have been used and a consideration of the use of such other cross-linking co-agents is contained in an article entitled "Evaluation of Cross-Linking Co-agents in Ethylene-Propylene Rubber" by Lenas in the September, 1963 (Volume 2, No. 3) issue of Industrial and Engineering Chemistry, at pages 202–208. As noted in this latter article, a wide variety of co-agents has been used including ethylene dimethacrylate, polyethylene glycol dimethacrylate, trimethylol propane trimethacrylate, divinyl benzene, diallyl itaconate, triallyl cyanurate, diallyl phthalate, allyl methacrylate, cyclohexyl methacrylate, vinyl toluene, vinyl pyridine, p-quinone dioxime, and acrylic acid. A similar disclosure is found in U.K. Pat. No. 1,047,053.

It is accordingly a principal object of the present invention to provide an improved cross-linked ethylene polymer.

It is another object of the present invention to provide a novel curing system for ethylene polymers.

It is still another object of the present invention to provide an improved cross-linked terpolymer of ethylene.

These and other objects are attained by the invention of this application which comprises a composition suitable for heat curing to produce a cross-linked ethylene polymer comprising 100 parts of a polyethylene, an EPDM polymer, or a copolymer of ethylene having a Tg greater than 25°C, and from about 0.2 to about 20 parts of triallyl phosphate. The triallyl phosphate serves the purpose of a co-agent and the ethylene polymer should be mixed also with from about 0.5 to about 10 parts of an organic peroxide catalyst in addition to the triallyl phosphate.

The ethylene polymer, in a preferred instance, is polyethylene itself. Low density polyethylene, i.e., having a specific gravity of 0.910 to 0.925, is especially adaptable to the invention herein although medium density polyethylene (specific gravity: 0.926 to 0.940) and high density polyethylene (specific gravity: 0.941 to 0.967) are also suitable. Both high molecular weight and low molecular weight polyethylenes are contemplated; in general, the high molecular weight polyethylenes have better physical properties than their low molecular weight counterparts, especially with respect to impact resistance (toughness), chemical resistance and stress crack resistance. On the other hand, because of their higher melt viscosity, the high molecular weight polyethylenes are more difficult to process.

Another preferred class of polymers of ethylene are those designated as EPDM. These are described in detail in Gresham et al., U.S. Pat. No. 2,933,480; Tarney, U.S. Pat. No. 3,000,866; Gladding et al., U.S. Pat. No. 3,063,973; and Gladding et al., U.S. Pat. No. 3,093,620. As more fully described in these patents, EPDM is a terpolymer of ethylene, propylene and a small proportion of a non-conjugated diolefin. For the purposes of this invention it preferably contains from about 0.1 to about 10 or more percent of diene. As with the other polymers of ethylene above, a wide range of molecular weight of these EPDM polymers is suitable for use in the invention of this application.

Another preferred class of ethylene polymers are those copolymers which have a Tg greater than 25°C. These include principally copolymers of ethylene and less than about 10% of propylene, vinyl acetate, ethyl acrylate or the like.

With respect to the ethylene polymers contemplated herein, it will be noted that they have in the past been cross-linked by irradiating them in the presence of a polyfunctional monomer such as triallyl cyanurate or, alternatively, by simultaneously treating them with an organic peroxide and the polyfunctional monomer.

Irradiation involves, simply, exposure of a relatively thin sheet of the ethylene polymer plus cross-linking agent with a high energy electron beam. The dosage must be at least about 5 Mrads, i.e., megarads, otherwise little vulcanization is observed. A suitable dosage is from about 5 to 15 Mrads. Irradiated polymer exhibits improved stress-strain relationships with respect to ordinary, i.e., unirradiated polymer. The irradiation of polyethylene containing small proportions of cross-linking monomers such as triallyl cyanurate and triallyl phosphate is shown in the above U.K. patent. The use of a wide variety of cross-linking monomers is shown in a Plastec Report R41 issued March, 1971 by the Picatinny Arsenal at Dover, New Jersey and entitled "Applications of Ionizing Radiations in Plastics and Polymer Technology."

Peroxide cross-linked ethylene polymers are more widely produced than irradiated ethylene polymers, in part because they are not limited in their application to thin cross sections. The peroxide must be sufficiently stable to permit its incorporation into the polymer via the usual processing techniques without volatilizing or decomposing. Dicumyl peroxide is commonly used, and other peroxides having suitable curing activity and thermal stability, i.e., so as to withstand conditions of mixing and in some instances extrusion, include 2,5-bis (t-butyl peroxy)-2,5 dimethylhexane, di-t-butyl peroxide and 2,5-dimethyl-2,5-di (t-butyl peroxy) hexyne-3.

The amount of organic peroxide to be used in the cross-linking reaction herein may as indicated vary from about 0.5 to about 10 parts per 100 parts of ethylene polymer. The use of triallyl phosphate as a co-agent is effective to reduce the optimum proportion of peroxide. In most instances, from about 1.0 to about 5.0 parts of peroxide are suitable and are preferred.

The amount of triallyl phosphate used in the cross-linking process herein may range from about 0.2 to about 20 parts per 100 parts of ethylene polymer. The optimum amount will depend in large part on the particular polymer to be cross-linked and the degree of cross-linking which is desired; some peroxides may also require less triallyl phosphate than others, although this is a lesser factor. In general, the preferred amount is within the range of from about 1.0 part to about 7.5 parts per 100 parts of ethylene polymer.

Best results are obtained with a weight ratio of triallyl phosphate to peroxide of from about 1 to about 5, preferably about 3.5.

The cross-linked ethylene polymers of this invention should contain an antioxidant for protection against aging at high temperature. Several types are suitable, including phenolic and amine antioxidants, more specifically, alkylated phenols, bisphenols, thio and dithio bis, tris and polyphenols, alkylidene bis, tris and polyphenols, styrenated phenols and aromatic amines. In most instances the antioxidant will contain an alkyl-substituted benzene ring wherein the alkyl group contains 1–10 carbon atoms. Illustrative examples include 2,6-di-t-butyl-p-cresol, octadecyl 3,5-di-t-butyl-4-hydroxy-hydrocinnamate, 2,2'-methylene bis (6-t-butyl-4-methyl phenol), 4,4'-thiobis (6-t-butyl-4-methyl phenol), tetrakis [methylene (3,5-di-t-butyl-4-hydroxy-hydrocinnamate)] methane, N-phenyl-alpha-naphthyl amine, N,N'-diphenyl p-phenylene diamine, N-phenyl-beta-naphthyl amine, p-isopropoxy diphenyl-amine, butylated bisphenol A, polymerized 1,2-dihydro-2,2,4-trimethylquinoline, and 4,4'-butylidene poly (6-t-butyl-3-methyl phenol).

The amount of antioxidant may range from about 0.01 to about 3.5 parts per 100 parts of ethylene polymer.

The curing step of this invention is carried out at elevated temperature, e.g., 200°C. Lower temperatures may in some instances be used, depending on the peroxide which is involved, but ordinarily temperatures below about 125°C are unsatisfactory. On the other hand temperatures above about 250°C are unnecessarily high and produce no significantly better curing than is achievable at or below 250°C.

Typically, the ethylene polymer is mixed in an intensive mixer with filler, antioxidant, pigment and peroxide, then milled and fed to a pelletizer or dicer.

The wire and cable industry uses a large proportion of cross-linked ethylene polymer and for such use the uncured polymer is extruded with a screw having a compression ratio of about 3 to 1. The composition must be fluxed thoroughly and the temperature maintained uniformly at a temperature below the decomposition point of the peroxide so as to minimize the possibility of scorch.

Wire and cable extrusions generally are cured continuously. As the coated cable, e.g., leaves the die of the extruder, it immediately enters a high pressure steam pipe where steam pressures of 200 psig (200°C) and higher prevail; curing is accomplished in a matter of seconds.

The effectiveness of the novel composition compared with that of other co-agents herein is shown in the following examples, which, of course, are not to be construed as limiting the scope of the invention.

EXAMPLE I

Several ethylene polymer compositions are prepared, each containing 100 parts of low density polyethylene, 60 parts of hydrated silica (0.1 microns), 0.9 part of Irganox-1010 (tetrakis [methylene (3.5-di-tert-butyl-4-hydroxy-hydrocinnamate)] methane), 0.25 part of stearic acid, 1.0 part (except for a control composition) of dicumyl peroxide and, except for the above and a second control composition, 2.0 parts of a co-agent. These compositions (minus the dicumyl peroxide) are mixed in a Banbury mixer and immediately put on a 2-roll mill at 104°C whereupon the dicumyl peroxide is added; the composition is removed as a ¼ inch sheet. The sheet is then press molded (to cure it) by placing a 60-gram portion in a 6 inch × 6 inch × 0.08 inch cavity mold and then compressing it at 166°C in a Hydrolair press. The cured product is tested for ultimate tensile, modulus (at 100%, 200% and 300%) and elongation (ASTM Designation D412), tear strength (ASTM Designation D624), and hardness (ASTM Designation D676, using a Shore D Durometer). Results are obtained before and after heating in an oven at 177°C for 120 hours, so as to permit an evaluation of the thermal stability of the tested samples. The results are shown in Table I.

All parts and percentages herein, including the claims, are by weight unless otherwise expressly stated.

TABLE 1

Co-agents In Peroxide Vulcanized Polyethylene

| Coagent | NONE | NONE | Triallyl Phosphate | Diallyl Allyl Phosphonate | Triallyl Cyanurate | Trimethylol Propane Trimethacrylate |
|---|---|---|---|---|---|---|
| Dicumyl Peroxide (Parts) | 1.0 | 3.0 | 1.0 | 1.0 | 1.0 | 1.0 |
| Ultimate Tensile (psi) | 1455 | 1685 | 2033 | 2208 | 1933 | 1742 |
| Modulus (psi): 100% | 1505 | 1653 | 1933 | 1892 | 1792 | 1725 |
| 200% | — | 1618 | 2000 | 2042 | 1892 | 1733 |
| 300% | — | 1648 | — | — | — | — |
| Elongation (%) | 140 | 363 | 287 | 290 | 240 | 227 |
| Tear Resistance, Die C (pounds/inch) | 171 | 428 | 425 | 466 | 442 | 409 |
| Hardness | 56 | 56 | 61 | 57 | 60 | 59 |
| After 120 hrs. at 177°C | | | | | | |
| Ultimate Tensile (psi) | F* | F* | 2383 | F* | F* | F* |
| | A | A | | A | A | A |
| | I | I | | I | I | I |
| Modulus (psi): 100% | L | L | 2117 | L | L | L |
| 200% | | | 2350 | | | |
| Elongation (%) | E | E | 277 | E | E | E |
| Tear Resistance (pounds/inch) | D | D | 376 | D | D | D |
| Hardness | | | 61 | | | |

*Surfaces badly cracked and very boardy.

It will be noted that only the triallyl phosphate-cured sample survives the 120-hour period of heating. The other samples are substantially decomposed. Furthermore, the physical properties of the sample heated for 120 hours are not significantly different from those of the unheated sample.

EXAMPLE II

Ethylene terpolymers are also susceptible of improvement in accordance with the invention herein. This is shown by the results of tests carried out on a cross-linked copolymer of ethylene, propylene and a small proportion of 1,4-hexadiene (EPDM) prepared as follows. A mixture of 100 parts of EPDM polymer, 96 parts of hydrated silica (0.1 microns), 15 parts of paraffin oil and 1.5 parts of Agerite-D [poly (1,2-dihydro-2,2,4-trimethyl) quinoline] is prepared in a Banbury mixer at 182°–200°C, then milled on a 2-roll mill at 88°–93°C while 2.6 parts of dicumyl peroxide, 5.2 parts of co-agent and an additional 4 parts of hydrated silica are added. The resultant sheet is press-cured at 171°C, then tested as in the preceding examples, with the results shown in Table II. Test results are shown both before and after heating at 177°C for 72 hours.

TABLE II

CO-AGENTS IN PEROXIDE VULCANIZED EPDM

| Co-agent | Triallyl Phosphate | Triallyl Cyanurate | Trimethylol Propane Trimethacrylate |
|---|---|---|---|
| Ultimate Tensile (psi) | 1650 | 1358 | 1533 |
| Modulus (psi): 100% | 550 | 575 | 342 |
| 200% | 1217 | 1250 | 750 |
| 300% | — | — | 1208 |
| Elongation (%) | 283 | 237 | 375 |
| Tear Resistance, Die C (pounds/inch) | 170 | 151 | 176 |
| Hardness* | 78 | 80 | 75 |
| After 72 Hrs. at 177°C | | | |
| Ultimate Tensile (psi) | 1330 | F** | F** |
| Modulus (psi): 100% | 533 | A | A |
| Elongation (%) | 197 | I | I |
| Tear Resistance, Die C (pounds/inch) | 128 | L | L |
| Hardness* | 80 | E | E |
| | | D | D |

*These hardness values are obtained on a Shore A Durometer
**Surfaces badly cracked and very boardy Again, the superiority of triallyl phosphate as a cross-linking co-agent is apparent. The physical properties of the triallyl phosphate-cross-linked EPDM are diminished only slightly by the 72-hour heating treatment whereas the triallyl cyanurate — and trimethylol propane trimethacrylate-cross-linked EPDM's are badly decomposed by such treatment.

All parts and percentages herein are by weight unless otherwise expressly stated.

What is claimed is:

1. A composition suitable for heat curing to produce a cross-linked ethylene polymer comprising 100 parts by weight of a polyethylene, a copolymer of ethylene having a Tg greater than 25°C, or an EPDM polymer, from about 0.2 to about 20 parts by weight of triallyl phosphate, and from about 0.5 to about 10 parts by weight of an organic peroxide catalyst.

2. The composition of claim 1 wherein the peroxide catalyst is dicumyl peroxide.

3. The composition of claim 1 wherein the weight ratio of triallyl phosphate to peroxide is at least about 1.

4. The heat-cured product of claim 1.
5. The heat-cured product of claim 2.
6. The heat-cured product of claim 3.

7. The composition of claim 1 wherein the ethylene polymer is an EPDM polymer.

8. The composition of claim 1 wherein the ethylene polymer is polyethylene.

9. The composition of claim 1 wherein the ethylene polymer is low density polyethylene.

10. A composition suitable for heat curing to produce a cross-linked ethylene polymer comprising 100 parts by weight of an EPDM polymer, from about 0.1 to about 3.5 parts by weight of a phenolic or amine antioxidant, from about 1 to about 10 parts by weight of an organic peroxide catalyst, and from about 0.2 to about 20 parts by weight of triallyl phosphate.

11. The composition of claim 10 wherein the peroxide catalyst is dicumyl peroxide.

12. A composition suitable for heat curing to produce a cross-linked ethylene polymer comprising 100 parts of low density polyethylene from about 0.1 to about 3.5 parts by weight of a phenolic or amine antioxidant, from about 1 to about 10 parts by weight of an organic peroxide catalyst, and from about 0.2 to about 20 parts by weight of triallyl phosphate.

13. A composition suitable for heat curing to produce a cross-linked ethylene polymer comprising 100 parts by weight of an ethylene polymer, from about 0.1 to about 3.5 parts by weight of a phenolic or amine antioxidant, from about 1 to about 10 parts by weight of an organic peroxide catalyst, and from about 0.2 to about 20 parts by weight of triallyl phosphate.

* * * * *